(12) United States Patent
Brandenburger et al.

(10) Patent No.: US 10,934,049 B2
(45) Date of Patent: Mar. 2, 2021

(54) CONTAINER FOR RECEIVING AN ENTERAL NUTRITION SOLUTION

(71) Applicant: Fresenius Kabi Deutschland GmbH, Bad Homburg (DE)

(72) Inventors: Torsten Brandenburger, Reichelsheim (DE); Stefan Schwerer, Florstadt (DE); Christian Ebert, Frankfurt (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 33 days.

(21) Appl. No.: 15/766,401

(22) PCT Filed: Oct. 7, 2016

(86) PCT No.: PCT/EP2016/074030
§ 371 (c)(1),
(2) Date: Apr. 6, 2018

(87) PCT Pub. No.: WO2017/060446
PCT Pub. Date: Apr. 13, 2017

(65) Prior Publication Data
US 2018/0290783 A1 Oct. 11, 2018

(30) Foreign Application Priority Data
Oct. 9, 2015 (EP) ..................... 15189118

(51) Int. Cl.
*B65D 1/02* (2006.01)
*B65D 23/00* (2006.01)
*B29L 31/56* (2006.01)

(52) U.S. Cl.
CPC ......... *B65D 1/0223* (2013.01); *B65D 23/003* (2013.01); *B29L 2031/565* (2013.01); *B65D 2501/0081* (2013.01)

(58) Field of Classification Search
CPC .......... A61M 5/1417; B29L 2031/565; B65D 1/0223; B65D 1/42; B65D 23/003; B65D 2501/0081; B65D 79/005
(Continued)

(56) References Cited

U.S. PATENT DOCUMENTS 3,387,732 A * 6/1968 Jellies ................. A61M 5/1417
215/375
3,388,832 A * 6/1968 Stewart ..................... F42D 1/10
222/1

(Continued)

FOREIGN PATENT DOCUMENTS

| EP | 0 063 648 | 11/1982 |
|---|---|---|
| EP | 0063648 | 11/1982 |

(Continued)

OTHER PUBLICATIONS

Chunlei, Liu. *Packaging Materials and Structural Design*. Beijing: Printing Industry Press:, 2009, pp. 72-73.

*Primary Examiner* — Jeffrey R Allen
(74) *Attorney, Agent, or Firm* — Occhiuti & Rohlicek LLP

(57) ABSTRACT

Disclosed is a container comprising an opening to bring an enteral nutrient solution into or out of the container, a base which lies opposite the opening in a direction of longitudinal extent of the container for depositing of the container upright on an underlying surface, a hanging element arranged on the base in a first position extending substantially along the base, or in a second position where it protrudes at an angle from a plane defined by the base, and a hinge device which connects the hanging element to the base at a first end of the hanging element, to transfer the hanging element from the first into the second position. A receiving region for the hanging element is formed in the base. The hanging element can be releasably fixed in the first (Continued)

position using a connecting device. The hanging element is fixed movably within the first position.

20 Claims, 7 Drawing Sheets

(58) Field of Classification Search
 USPC .................................................. 220/670, 671
 See application file for complete search history.

(56) References Cited

U.S. PATENT DOCUMENTS

| | | | | |
|---|---|---|---|---|
| 3,537,498 | A * | 11/1970 | St Amand | B65D 23/102 604/403 |
| 3,581,928 | A | 6/1971 | Amand et al. | |
| 3,901,399 | A | 8/1975 | McPhee | |
| 4,013,187 | A * | 3/1977 | Betka | A61M 5/1417 215/399 |
| 5,086,952 | A | 2/1992 | Kryk | |
| 5,123,554 | A * | 6/1992 | Arvidson | B65D 1/0215 215/12.2 |
| D498,143 | S * | 11/2004 | Rashid | D9/541 |
| 8,561,821 | B2 | 10/2013 | Harris et al. | |
| 8,739,994 | B1 * | 6/2014 | Pritchett, Jr. | B65D 1/40 215/373 |
| 2011/0168662 | A1 * | 7/2011 | Harris | B65D 90/36 215/381 |
| 2011/0168882 | A1 | 7/2011 | Hoyes | |
| 2011/0240673 | A1 * | 10/2011 | Araujo | A61J 1/05 222/105 |
| 2014/0197127 | A1 * | 7/2014 | Lane | B29C 49/541 215/371 |

FOREIGN PATENT DOCUMENTS

| | | |
|---|---|---|
| FR | 1602406 | 11/1970 |
| GB | 1207017 | 9/1970 |
| WO | 2014/078404 | 5/2014 |
| WO | 2014/143415 | 9/2014 |

* cited by examiner

CONTAINER FOR RECEIVING AN ENTERAL NUTRITION SOLUTION

CROSS REFERENCE TO RELATED APPLICATIONS

This application is the national phase under 35 USC 371 of international application no. PCT/EP2016/074030, filed Oct. 7, 2016, which claims the benefit of the priority date of European application no. 15189118.1, filed Oct. 9, 2015. The contents of the aforementioned applications are incorporated herein by reference in their entireties.

The present invention relates to a container for receiving an enteral nutrient solution according to the preamble of claim 1.

In the case of containers for receiving an enteral nutrient solution, said containers frequently being configured as bottles, it is generally required firstly to be able to store said containers securely and secondly to be able to use them in a simple manner for dispensing an enteral nutrient solution contained in the container.

U.S. Pat. No. 5,123,554 A discloses a bottle which is provided for filling with a heat-sensitive nutrient solution. Said bottle here has a hanging device which is integrally formed on the underside of the base of the bottle. The hanging device extends here in a diagonal direction virtually over the entire width of the bottle and requires a correspondingly complicated configuration of the bottle base. The wide design of the hanging device has therefore been clearly selected in order to ensure a good transmission of force between a hanging device, to which the bottle can be fastened, and the bottle itself. However, in the case of hanging devices of this type, it has been shown in practice that, despite having a relatively great width, they have to be designed to be highly stable in order to prevent them from being unintentionally torn off. This is because if a hanging device of this type is inadvertently torn on one side, it easily tears open over the entire width. Since the hanging device extends over virtually the entire base of the bottle, unintentional tearing can easily occur. This is because, with this wide configuration, there are a plurality of starting points for corresponding forces, via which the hanging device may be unintentionally torn. In addition, a hanger configured in such a manner can adversely affect the stability of the bottle, for example upon being deposited on a table. WO 2014/143415 A1 describes a bottle having a movable hanger, and a device and a method for producing said hanger.

U.S. Pat. No. 3,581,928 describes a container for medical fluids, which has a hanger on its base. In order to be able to deposit the container on a flat surface, the hanger is transferred into a position in which it engages behind a lug arranged on the container base and is fixed with a snap action.

WO 2014/078404 A1 discloses an alternative configuration of a base of a bottle for receiving an enteral nutrient solution, in which the aforementioned problems do not occur. In the case of this bottle, a complicated base configuration is provided with a voluminous incision in order to form a hanging device between those portions of the base which have not been cut into. This hanging device is not mounted movably, which is associated with restrictions in the ease of use of the bottle. Furthermore, the complicated base configuration requires a relatively great material thickness in the base region and a more complicated method for producing the entire bottle.

The present invention is based on the object of providing a container for receiving an enteral nutrient solution, in which the intention is to overcome disadvantages known from the prior art. In particular, the intention is to provide a container which can be fastened simply "upside down" with a hanging device to a hook, but can also be securely positioned on a depositing surface, for example a table. In particular, the intention is to design the hanging device to be more stable in use than the solutions known from the prior art, but at the same time to be able to be produced in a less complicated manner and with less use of material. Furthermore, the intention is also to improve the handling of the hanging device.

This object is achieved with a container for receiving an enteral nutrient solution having the features of claim 1.

A container of this type has an opening via which an enteral nutrient solution can be brought into the container or out of the container. Furthermore, the container has a base which lies opposite the opening in a direction of longitudinal extent of the container and which serves for the depositing of the container upright on an underlying surface. If the container is thus standing on the base, the opening of the container points upward away from the base. The container furthermore has a hanging element which is arranged on an underside of the base and can be present in two positions. In a first position, it extends substantially along the base of the container, for example parallel to a plane, which is defined by the base, along an outer side of the base. In a second position, it protrudes at an angle, for example perpendicularly, from the plane defined by the base.

When the hanging element is in its first position, the container can be present in a filling state or in a storage state, in which it can be filled or stored. For this purpose, the container can be used in particular in a manner standing on its base. With the hanging element in its first position, the container can also be used as a drinking container, e.g. drinking bottle. When the hanging element is in its second position, the container can be hung on a hanging device, for example a hook or a stand, with the opening pointing downward. It is also possible in this case, in particular in conjunction with a connected transfer system, to refer to the dispensing state or use state of the container.

Furthermore, the container has a hinge device which connects the hanging element at a first end of the hanging element to the underside of the base. The hinge device serves to be able to transfer the hanging element from the first position into the second position and from the second position into the first position. That is to say, the hanging element can be folded over from one position into the other position in each case by means of the hinge device. It is provided and conceivable here for a repeated change of the states of the container to be able to be achieved by changing the position of the hanging element. For example, the container may initially be in its filling state and then transferred into its use state. If use is not made of the entire enteral nutrient solution present in the container, the container can subsequently be transferred again into its storage state, namely by transfer of the hanging element from the second position into the first position. The hanging element can later be transferred again from the first position into the second position and therefore the container can be transferred from the storage state into the use state.

According to the invention, the container is distinguished in that, in the base, a receiving region is formed for the hanging element, in which the hanging element can be releasably fixed in the first position by means of a connecting device. As a result, the hanging element can be securely positioned in the receiving region. The intention is for the hanging element to be transferred from its first position into its second position by specific release or opening of the connecting device. For example, an inclined position of the container due to an unintended, angularly protruding hanging element can be substantially avoided. The receiving region for the hanger is preferably designed as a depression in the base of the container. According to the invention or preferably, the hanging element is not fixed rigidly in the first position, but rather is fixed movably within the first position. According to the invention or preferably, the second free end of the hanging element is movable or fixed movably from the top downward within the first position. The release of the hanging element from its first position is thereby in particular facilitated since a manual intervention, for example by means of a fingertip and/or a fingernail, between the hanger and the base of the container or the base of the receiving region is facilitated.

In an additional or alternative refinement according to the invention, the container is distinguished in that the hinge device extends merely over a width of the hanging element that corresponds to the width of a second end of the hanging element, which end lies opposite the first end of the hanging element in a direction of longitudinal extent of the hanging element. "Width" is defined here as an extent in that direction which extends transversely with respect to the direction of longitudinal extent of the hanging element. Within the context of the invention claimed here, two widths (or two lengths or two other portions) correspond to one another if they differ from each other by up to 50%, in particular with respect to the larger width, in particular by up to 30%. In an alternative or additional refinement of the invention, the hinge device extends over a width which is smaller than the width of the second end of the hanging element. In a variant, two mutually corresponding widths, lengths or portions may also be identical or substantially identical to each other.

By means of such a hinge device which is matched to the dimensions of the second end of the hanging device and has a reduced width in comparison to the prior art, first of all less material is required for producing the hinge device. Furthermore, the space required by the hinge device in its first position is significantly reduced. This ensures greater freedom in the configuration of the base of the container. Furthermore, there are fewer starting points for forces, by means of which the hinge device could be torn off or destroyed in some other way. Finally, the transmission of force to the hinge device is also improved if a force is applied to the hanging device at the second end of the hanging device, for example with a finger.

By contrast, in the case of hinge devices which are known from the prior art, the introduction of force in those regions which are arranged further away from the maximum width extent of the second end of the hanging device is more unfavorable. Here, a greater force generally has to be worked with in the region of the second end of the hanging device in order to transfer the hanging device from the one position into the other position. This may then in turn lead to inadvertent destruction of the hinge device.

In comparison to solutions which are likewise known from the prior art and in which a hinge device is not provided at all, but rather a hanging device is permanently accessible, this embodiment according to the invention affords the advantage that the base of the container can be produced in a much less complicated manner and with lower material strength. This facilitates the production process of a corresponding container and reduces the production costs.

Furthermore, an unintentional introduction of force to the hanging element can be substantially reduced if the hanging element is positioned or fixed securely in the receiving region by means of the connecting device.

The connecting device according to the invention is a releasable connecting device. The hanging element is preferably repeatedly fixable in and releasable again from its first position by means of the connecting device. The hanging element can be repeatedly transferred here from the first into the second position, and vice versa. In a variant according to the invention, the connecting device is provided by a snap-action connection. This constitutes a type of connection which is simple to produce.

In order to provide the connecting device, in particular the snap-action connection, in one embodiment the hanging element has, in a region of its second end, at least one projection which is provided and configured to engage behind a structure of the receiving region in order to fix the hanging element in the first position. The at least one projection serves to engage behind a structure of the base, in particular of the receiving region, preferably in the manner of an undercut in order to fix the hanging element in the first position. For example, the projection can be provided and configured to be clicked into a corresponding structure of the base. The stability of the container is ensured whenever the hanging element is fixed in the first position. At the same time, by application of a force which is greater than or equal to the holding force of the hanging element in the first position, the hanging element can be released such that it can be subsequently transferred into the second position when the container is intended to be transferred into its use state. The structure is preferably provided by at least one lateral depression in the receiving region.

As has already been explained above, the hanging element is not fixed rigidly in the first position, but rather is fixed movably within the first position. The second free end of the hanging element is fixed movably from the top downward within the first position. As a result, in particular the release of the hanging element from its first position is facilitated since a manual intervention, for example by means of a fingertip and/or a fingernail, between the hanger and the base of the container is made possible or is at least facilitated. In one embodiment, this movability of the hanging element is achieved or at least assisted by the fact that the hinge is arranged on a pedestal which provides the transition to the base of the container. The pedestal preferably has a ridge, to which the hinge is attached, on a side lying opposite the container base. The movability in the first position can thereby be assisted. Alternatively or additionally, the movability of the hanging element is also achieved by the fact that a thickness of the second free end of the hanging element, in particular of the hanging element, is selected to be smaller than the height of the receiving region for the hanger. By means of the selected shapes and/or dimensions, play between the hanger and the receiving region is provided in the first position of the hanger. In particular, the hanger can thereby be very easily released from its first position and brought into the latter again.

A further embodiment is characterized in that an indentation or constriction is formed between the second free end of the hanging element and the hinge. The indentation provides a type of gripping region, for example for the index finger and the thumb, and can assist the hanging of the container. The constriction is preferably formed concavely at least in sections. This inwardly directed curvature permits in particular ergonomic gripping of the hanger with the fingers.

The receiving region for the hanging element preferably has a height which decreases from an outer side toward the longitudinal axis of the container. As a result, firstly, the length of the hanging element can be increased and thus the handleability improved in the second position of the hanging element. Secondly, the hanging element can continue to be stored securely in its first position in the receiving region, without protruding laterally. The receiving region, starting from the hinge, in particular the pedestal, is preferably formed by at least three portions, a first inner portion which merges via a first inner crease into a second central portion. The latter merges in turn via a second outer crease into a third outer portion. The first inner portion runs substantially transversely, preferably perpendicularly with respect to the longitudinal axis of the container. The second central portion forms a, preferably rectilinear, ramp. The outer third portion here forms a shorter ramp with a greater pitch. The first crease and/or the second crease can be provided by an angled transition or by a rounded transition.

It is also possible for further structural measures to be undertaken in order additionally or alternatively to assist the manual engagement in the receiving region for releasing the hanger from its fixed first position. For example or according to the invention, the receiving region can have a crease toward the outer side of the container, preferably the second crease, in particular in the direction of the opening of the container. As a result, the opening can be enlarged for engaging with or gripping under the hanging element.

Alternatively and/or additionally, an upper edge of the receiving region can be formed concavely at least in sections. The hanger can thereby be more easily accessed in order to transfer it from its first position into its second position.

In a further variant, the container according to the invention is characterized in that a first and a second receiving region for the hanging element are formed in the base of the container. The hanging element is preferably movable from the first into the second receiving region and back again. As a result, for example, wear on one side of the hinge can be reduced or avoided. In one refinement, the first and the second receiving region are arranged opposite each other and/or are of substantially identical design.

A further embodiment of the container is characterized in that a foot region for the standing up of the bottle is formed in an outer region of the base and/or in that a trough, through which the receiving region for the hanger extends, is formed in the base, preferably starting from the foot region. The trough assists in particular ergonomic gripping and holding of the hanger with the fingers.

In one variant, the hanging element has an aperture in a region of its second end, for example in the form of a round hole or an elongated hole, for receiving a hanging device. If the container is intended to be used in its use state, i.e. in operation of the container as intended, the hanging device can reach through the aperture. Universal use of the container with numerous different hanging devices is therefore possible.

In order to achieve particularly simple production of the container, in one variant, said container is composed of precisely a single material. Suitable materials are, for example, polypropylene (PP) or polyethylene (PE), for example high density polyethylene (HDPE). Other plastics materials, for example copolymers which have monomer units consisting of propylene, ethylene, butylene, butadiene, styrene and/or isoprene, can likewise be used.

While containers known from the prior art regularly have a multilayered construction, the container claimed here in one variant is constructed from a single material layer. This likewise facilitates the production and the subsequent reuse of the container. However, it may also have a multilayered construction.

The container can be constructed, for example, from a semitransparent or a translucent material. This makes it possible easily from the outside to recognize the filling state of an enteral nutrient solution accommodated in the container. The container may also be non-transparent in sections because of an applied label, applied print and/or an applied coating.

The cross section of the container is preferably enlarged in the region of the base in comparison to the central region of the container. As a result, firstly, the stability can be improved if the container is intended to be deposited, for example, on a table. Secondly, the container can thereby be securely gripped if it is intended to be hung upside down via its hanger.

In a further variant, at least in a portion which lies approximately in the center of the container in the direction of the longitudinal extent of the container, the container has a cross section which has mutually adjacent, convexly curved and rectilinear portions in an alternating arrangement. In one variant, rectilinear portions and convexly curved portions in each case lie precisely opposite one another. The container can thereby be gripped particularly simply and securely. In addition, by means of the arrangement of such rectilinear portions, the container cannot only be stored in a standing position, but also in a lying position, namely by using a rectilinear portion as a standing or lying surface. Even in the event that the container is stored in a lying position, it is extremely advantageous if the hanging element is fixed securely in its first position. This is because the container then does not have any elements which protrude unnecessarily outward and would increase the space required for lying storage.

Edges (or corners in cross section) arise at the transitions between the convexly curved and the rectilinear portions of the side walls of the container, and therefore the previously discussed cross section may also be referred to as a substantially polygonal cross section.

In one variant, the rectilinear portions have a width which, in a portion of the container that lies closer to the opening than the central portion, is greater than in the central portion of the container. Even easier grippability of the container is thereby achieved. This is because a user of the container is then intuitively animated to grip the container in precisely that rectilinear portion which is configured to be wider. Since said portions lie above the central portion of the container, gripping in such a case takes place in a region which lies significantly above the center of gravity of the container. Consequently, the container is self-stabilizing, as a result of which secure transport by hand and secure handling of the container are ensured.

In a further variant, at least in a portion facing closer to the base than the central portion of the container, the container can have a cross section which has convexly curved portions and at least one concavely curved portion in an alternating arrangement. The convexly curved portions and the concavely curved portion or the concavely curved portions are preferably arranged directly following one another. For example, the above-explained rectilinear portions can be replaced in this region of the container by concavely curved portions. This produces a cross section of the container that corresponds to a stylized flower. The advantages of such a configuration are then realized in particular if the hanging element, in its first position, extends between two mutually opposite concavely curved portions or extends between a concavely curved portion which lies opposite a rectilinear portion, as is provided in one variant. This is because the concavely curved portions then permit particularly simple access to the hanging element such that the latter can be transferred in a simple manner from its first position into its second position and, if required, from its second position into its first position.

In one variant, only a single concavely curved portion which is arranged between two convexly curved portions may be provided. A cross-sectionally rectilinear portion, for example, may be arranged opposite said concavely curved portion. In this variant, it is provided in particular that, in the first position of the hanging element, the second end of the hanging element faces the concavely curved portion while the hinge device at the first end of the hanging element is arranged on a rectilinear portion or on a convexly curved portion of the cross section of the container. Also in this variant, as before, there is good accessibility to the second end of the hanging element, and therefore the latter can be transferred in a simple manner from the first into the second position and from the second into the first position.

In one variant, the container, the hanging element, the hinge device and in particular the pedestal are formed integrally. This facilitates the production of the container and ensures simple, but nevertheless secure handling of the container or of the hanging element.

In a further variant, the side walls of the container are configured to be free of horizontally and/or vertically running ribs. Ribs of this type can be used in containers for enteral nutrient solutions in order to ensure a better transmission of heat if, for example, the nutrient solution is intended to be brought to a certain temperature. However, ribs of this type require increased use of material and, in addition, a more complicated manner of production of the container. Furthermore, residues of the nutrient solution accommodated in the container frequently remain in ribs of this type, and therefore simple emptying of the residue from the container is made more difficult by such ribs. It is therefore advantageous for cost and efficiency reasons to dispense with ribs of this type.

According to the invention, in the base, a receiving region is formed for the hanging element, in which the hanging element can be accommodated in its first position. The hanging element is accommodated here in such a manner that the hanging element does not protrude beyond other regions of the base. For example, the hanging element can be arranged flush in relation to other regions of the base. In particular, a height difference between the receiving region on the outer side of the container and the remaining regions of the base in the direction of longitudinal extent of the container is a maximum of 15 mm. The height difference in the direction of longitudinal extent of the container between the receiving region and the remaining regions of the base can lie, for example, within a range of 0.5 to 15 mm.

In one variant, the container has a volume which is greater than 150 ml, in particular greater than 300 ml, in particular greater than 400 ml, in particular greater than 500 ml, in particular greater than 600 ml and very particularly greater than 750 ml. A suitable volume is, for example, within the range of 300 ml to 500 ml, wherein other regions which are formed from the abovementioned upper limits, are likewise conceivable and provided.

The container can be produced, for example, by extrusion blow molding. In another variant, production by means of stretch blow molding is provided.

In a further variant, the container has a connecting device around the opening, preferably a thread, for receiving a lid. The lid can have, for example, a connection with which the container can be connected to a transfer system, through which an enteral nutrient solution accommodated in the container can be transported to a patient.

The variants illustrated in conjunction with the explained container are transferrable in any desired combination to the separately described combination in an analogous manner.

A container according to the above explanations is suitable in particular to be used in combination with a lid having the features discussed below.

A lid of this type has a connecting device, preferably a thread, which can be brought into engagement with a connecting partner, preferably a mating thread, on a container for receiving an enteral nutrient solution. As a result, an opening in the container can be covered. Furthermore, the lid has a connection stub for the connection of a tube line. Said connection stub can be configured, for example, as a conventional port for the insertion of a spike.

An opening device is preferably provided on the inner side of the lid. Said opening device consists of two parts or comprises two parts. A first part is connected, preferably with a form fit and/or force fit, to the lid. The first part can be, for example, clipped or latched into the lid. The first part is connected, preferably permanently, to a second part of the opening device. The second part of the opening device comprises in particular a blade. The opening device can then be present either in a starting state or in an opening state. In the starting state, the second part of the opening device is fixed to the first part of the opening device by at least one fixing element. As a result, the second part of the opening device cannot be moved away from the first part of the opening device. On the contrary, the two parts are held on each other by the fixing element. In the opening state of the opening device, the fixing element no longer prevents movement of the second part in relation to the first part of the opening device. On the contrary, in the opening state of the opening device, the second part of the opening device can move relative to the first part of the opening device. The second part can be permanently movable in the opening state. In the opening state, the second part can also be movable in such a manner that it is movable only once from the starting state into the opening state and is optionally then retained, for example in a latching manner. The second part preferably is or remains permanently connected to the first part.

While the permanent connection between the first part of the opening device and the second part of the opening device does not permit any or any substantial relative movement of the two parts with respect to each other in the starting state of the opening device, this may therefore be possible in the opening state of the opening device. It is possible by means of this opening device to open a covering which covers the opening as standard in the container. That is to say, if a spike or another object is inserted through the connection stub into the lid, the spike itself does not provide for opening of the cover of the container. On the contrary, the spike transfers the opening device from the starting state into the opening state such that the second part of the opening device then ensures opening of the cover of the container. The opening or the hole in the cover of the container is produced by the blade of the second part, here by means of cutting. By means of the cutting, the blade permits a better defined opening of the cover in relation to an opening which substantially takes place by tearing open.

Said cover may in particular be a film, for example an aluminum film. Composite materials are also possible for the cover. Covers of this type are known per se. The present lid is suitable for all containers which are sealed with covers of this type. If the cover has been opened by the opening device, the lid continues to ensure that the opening of the container is covered. A liquid, for example an enteral nutrient solution, which is contained in the container can then only flow out of the container through an opening in the lid. Said opening in the lid is preferably provided by the connection stub for the connection of a tube line.

That is to say, if a tube line which bears a spike or another end piece is guided through the connection stub into the interior of the lid, it initially provides for the transfer of the opening device from the starting state into the opening state and subsequently for removal of liquid which is contained in the container.

For a user, the lid has the great advantage that its handling does not differ from lids known from the prior art. In particular, no further elements are required in addition to the lid and a tube line provided with an end piece, in order to use the lid during operation as intended. Nevertheless, because of the opening device present in its interior, the lid facilitates the opening of a cover of a container. In addition, the blade of the opening device ensures neat opening of the cover, and therefore the container opened with a lid of this type exhibits better discharging or pouring out behavior than a container which has been opened in the classical manner by piercing of a spike or of another end piece of a tube line into the cover of the container.

The second part comprises a blade-shaped design. A cutting edge of the blade or in general of the second part of the opening device is preferably formed on that side of the second part of the opening device which points away from the first part of the opening device. If the second part of the opening device then moves away from the first part (for example folds away) in the opening state of the opening device, the container cover arranged below the second part of the opening device can be contacted in a particularly simple manner by the cutting-knife-like contour or blade-shaped contour and, as a result, can be cut open. In one embodiment, the second part of the opening device is configured in sections on an underside of the blade or is completely configured in the manner of a cutting knife.

Expressed in other words, the second part of the opening device serves for cutting open a cover of a container onto which the lid is placed. As already explained above, the cover of the container can be composed in particular of an aluminum foil or a composite material which preferably contains aluminum. In this variant, the second part of the opening device then penetrates with its blade like a knife into the cover and ensures neat cutting open of the cover, as a result of which the pouring out behavior or discharging behavior of a liquid from the container is positively influenced in comparison to the solutions known from the prior art.

In a first variant, the fixing element can additionally take on the function of a hinge element. In another variant, the first part of the opening device and the second part of the opening device are not only connected to each other via the fixing element, but also additionally via a hinge element. The hinge element is configured here as a component which is formed separately from the fixing element. With an arrangement of this type, it is possible in a particularly simple manner for the second part of the opening device to be connected or remain connected to the first part of the opening device even if the opening device is no longer in its starting state. The hinge element can be designed, for example, as a web-like connecting element which has a certain flexibility and permits a relative connection of the second part of the opening device in relation to the first part of the opening device. For simple production, the opening device can be manufactured, for example, as an integral injection molded part.

In a further variant, the hinge element acts on a first end region of the second part of the opening device. A hinge axis is then defined on said first end region, about which the second part of the opening device can be moved or folded in relation to the first part of the opening device.

In a further embodiment of the opening device, the blade comprises a blade point which is formed in a second end region of the second part of the opening device, which end region lies opposite the first end region in the direction of longitudinal extent of the opening device. In this configuration, the cover of the container is first of all punctured by the blade point and then cut open by the blade, in particular by the cutting edge of the blade. By means of the blade point, the blade or the cutting edge of the blade can be positioned better on the cover for cutting open purposes, since the blade can engage in the puncture opening. Cutting open is therefore facilitated.

In order to provide the blade point, in a further variant an underside of the blade and a side surface of the blade run toward each other at an acute angle. The side surface of the blade is formed here in a second end region of the second part of the opening device. The second end region lies opposite the first end region in the direction of longitudinal extent of the opening device. That is to say, when the second part of the opening device is moved about the hinge axis, the first end region covers the greatest distance on an arc of a circle of the entire second part of the opening device. The acute angle between the underside of the blade and the side surface of the blade then ensures that the second part of the opening device can particularly readily puncture, i.e. initially open, a cover. That is to say, the pointed angle ensures sufficient sharpness of the blade to start cutting the cover.

In a further embodiment, the second part of the opening device has at least one wing which is arranged laterally on the blade. The at least one wing is preferably arranged on an upper side of the blade. Said wing takes on the function of a displacer for the cover in order to enlarge the opening produced in the cover by means of the blade. The cover is initially punctured by the blade point and then cut open further by the cutting edge of the blade. The wing or the wings push the cut-out cover to the side. As a result, the slot opening produced by the blade is enlarged toward the side, and therefore the flow through is increased. In a preferred refinement, the second part of the opening device has two wings.

The at least one wing is in particular positioned on the blade in a manner offset away from the blade point in the direction of the first end region of the second part of the opening device. This in particular assists the interaction of blade and wing by the cover first of all being opened by the blade and the slot opening which is produced then being enlarged by the wing or the wings. In one refinement of the at least one wing, the latter has an increasing width in the direction of the first end region of the second part of the opening device. As a result, the slot opening produced by the blade can be gradually widened further and therefore enlarged.

In a further variant, the first part of the opening device has a through opening in a central region of the first part. An extension piece of a tube line can be guided through said through opening in order to make contact with the second part of the opening device.

This extension piece of the tube line may also be referred to as an end piece and may be, for example, a spike. With this variant, it is particularly straightforward to pass a tube line, which has been passed through the connection stub of the lid, also through the first part of the opening device so that the end piece or the extension piece of the tube line can come into contact with the second part of the opening device. If an appropriate pressure is then exerted on the second part of the opening device, the opening device is transferred from the starting state into the opening state.

In one embodiment of the lid, a holding force of the first part of the opening device in the lid is greater than a force which is applied by the fixing element in order to fix the second part of the opening device on the first part of the opening device. With a refinement of this type, it is ensured that, during the transfer of the opening device from the starting state into the opening state, an extension piece of a tube line actually only brings about a relative movement of the second part of the opening device with respect to the first part of the opening device, but does not bring about a release of the opening device from the lid. As already mentioned, the first part of the opening device can be clipped, for example, in a lid region provided for this purpose. However, the first part may also be fitted, for example, by means of a snap-action ring.

In one refinement, the at least one fixing element has a cross section tapering from the first part in the direction of the second part of the opening device. As a result, firstly, a sufficient, mechanically stable connection can be provided between the first part and the second part of the opening device. Secondly, the targeted release of the second part from the first part, in particular when the extension piece of a tube line is inserted, can thereby also be assisted. In a preferred refinement, two fixing elements are provided.

In one refinement of the connection stub, the latter has a selection device. The connection stub preferably has, in sections, a geometry configured in a cross-shaped manner, preferably an opening configured in a cross-shaped manner. With a geometry of this type, it can be ensured that only an extension piece of a tube line that is adapted to said geometry can be inserted into the connection stub. The lid can thereby be specifically adapted for use in containers for enteral nutrient solutions. This is because a connection stub of this type does not allow passage of any cannulas or spikes which are provided for intravenous application of a drug or another solution. Consequently, it is thereby possible to avoid confusing different containers for different use purposes. The selection device is arranged in particular in an upper region of the connection stub. An upper side of the connection stub is preferably provided by the selection device.

In a further variant, a seal is arranged between the connection stub and the opening device, through which seal an extension piece of a tube line can be passed. The seal is preferably provided with a slot which is adapted to the geometry of the selection device. It is therefore optionally possible to assist the possibility of only an extension piece of a tube line having a defined geometry being connected. A seal of this type can be used, for example, if the connection stub already has a specifically configured geometry (for example a geometry configured in a cross-shaped manner). The seal then assists the function of the connection stub to the effect that essentially only a connection piece of a tube line having a specific geometry can be passed through the connection stub. On the other hand, it is also conceivable to use such a seal precisely whenever the connection stub has a geometry of any desired configuration. This is because a seal of this type can then ensure that only a connection stub of specific geometry can be passed through said seal and can transfer the opening device from the starting state into the opening state. Consequently, it is also possible with a seal of this type, similarly as with a specific internal geometry of the connection stub, to prevent a "wrong" connection stub from being able to be used to open the container on which the lid is placed.

In a further variant, the lid has a cap for sealing the connection stub. As a result, soiling of the connection stub prior to use of the lid can be effectively counteracted.

The cap for sealing the connection stub can be connectable to the lid, for example in a reversible manner. For example, the cap can be connected to the lid by a screw thread. The cap can then be screwed onto the lid or unscrewed from the lid. In one variant, it is provided that the cap is provided and configured to be removed from the connection stub by being broken out of the connection stub. This variant has the advantage that it is immediately apparent to a user which lid has already been used and which lid is in a new state in terms of fabrication. A tamper-evident closure is thereby provided. Contaminations of an enteral nutrient solution or of another liquid located in the container covered by the lid can thereby be avoided.

In a further variant, in the starting state, the second part of the opening device is arranged substantially parallel to the first part of the opening device while said part is or can be arranged transversely with respect to the first part of the opening device in the opening state. That is to say, in this variant, the relative movement between the first part of the opening device and the second part of the opening device is configured as a folding movement of the second part in relation to the first part. A particularly controlled and reproducible penetration of the second part of the opening device into a cover arranged below the lid can thereby be ensured. Such a reproducible opening of such a cover is not possible with the solutions known from the prior art since the tearing open behavior of a cover crucially depends on the pressure with which, for example, a spike or another connection part of a tube line is pierced through such a cover. This dependency is at least reduced or is even largely eliminated by the lid with the inserted opening device. This is because the opening device ensures an always substantially identical opening behavior of a cover located below it largely irrespective of the pressure with which a connection piece of a tube acts on said opening device.

In a further variant, the cover has at least one vent closed by a filter. The filter is permeable to gases. However, it is impermeable to liquids. The container on which the lid is placed can thereby be ventilated if a cover of the container has already been opened and a flow connection produced between the interior of the container and the lid. If a liquid kept in storage in the container then emerges from the lid through a tube line through the connection stub and therefore from the container, a corresponding volume of gas can flow into the container through the filter. The pressure between the interior of the container and an atmosphere surrounding the container is thereby equalized.

The first part of the opening device and the second part of the opening device are preferably composed of a material which is resistant to deformation in the case of the forces prevailing during use of the lid as intended. This makes it possible always to ensure reliable cutting open of a cover by means of the second part of the opening device. Suitable materials are, for example, plastics, such as, for example, polypropylene, polyethylene or polycarbonate. The wall thickness of the individual parts of the opening device should preferably be greater here than a thickness or wall thickness of a cover which is intended to be cut open by the opening device.

The opening device for a lid according to the previous explanations may also be present as such. The opening device is present with a first part, which is connected or is connectable to such a cover with a form fit and/or force fit and/or material bond, and a second part, which is connected, preferably permanently, to the first part and comprises a blade. In a starting state of the opening device, the second part of the opening device is fixed with at least one fixing element on the first part of the opening device. In an opening state of the opening device, the second part of the opening device is movable relative to the first part of the opening device.

Said opening device can be inserted into various lids. The precise configuration of the lids is less significant here. All that is relevant is that a receptacle is provided for the opening device.

The variants depicted in conjunction with the explained lid are transferrable in any desired combination to the separately described opening device in an analogous manner.

As already described, the above-described lid is suitable in particular for placing onto a container for receiving an enteral nutrient solution. The invention therefore also relates to a combination of a lid corresponding to the preceding explanations and a container for receiving an enteral nutrient solution, in particular corresponding to the preceding explanations. The container here has an opening via which an enteral nutrient solution can be brought into the container or brought out of the container. A connecting device, for example a thread, is arranged around the opening in order to receive the lid. The connecting device, for example the thread, of the lid and the connection partner, for example the thread, of the container are in engagement with each other here in such a manner that the lid covers the opening and seals the latter in a liquidtight manner. When required, a seal can be provided in the lid or on the container. The opening is provided here in particular with a cover which has to be opened first so that an enteral nutrient solution contained in the container can be transferred from the container into the lid and through the latter into a tube system.

Further details and particulars of the present invention will be explained with reference to an exemplary embodiment and corresponding figures, in which.

Figure 1:
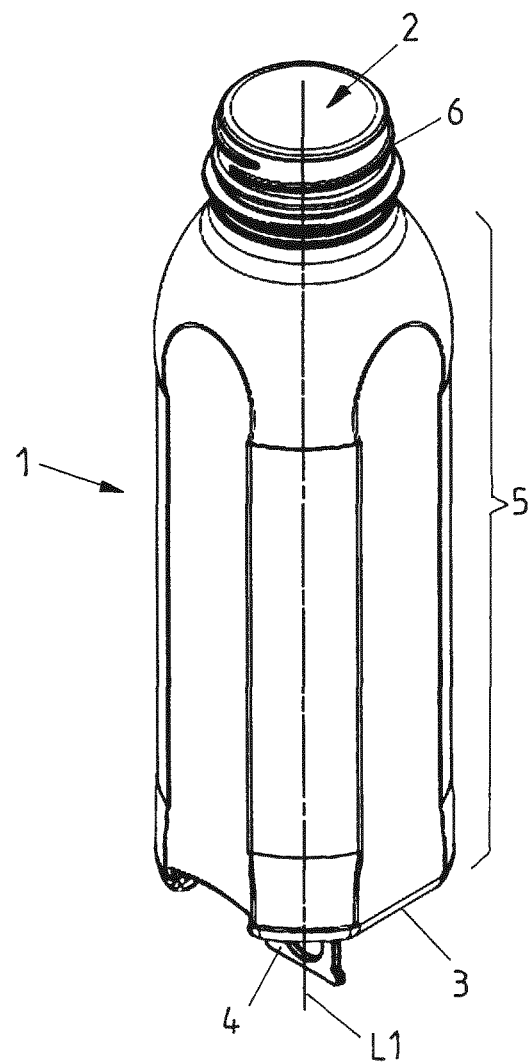
FIG. 1 shows a perspective view of an exemplary embodiment of a container for receiving an enteral nutrient solution.

FIG. 1 shows a perspective view of a bottle 1 as a container for receiving an enteral nutrient solution. Said bottle 1 extends along a first direction of longitudinal extent L1 and has an opening 2 at its upper end and a base 3 at its lower end. A hanging element 4 which will also be referred to below as hanger 4 for short is integrally formed on the base 3.

Side walls 5, the shape of which will also be discussed in detail in conjunction with the further figures, are formed between the opening 2 and the base 3.

A thread 6, onto which a lid can be screwed, is formed by way of example here around the opening 2.

Figure 2A:
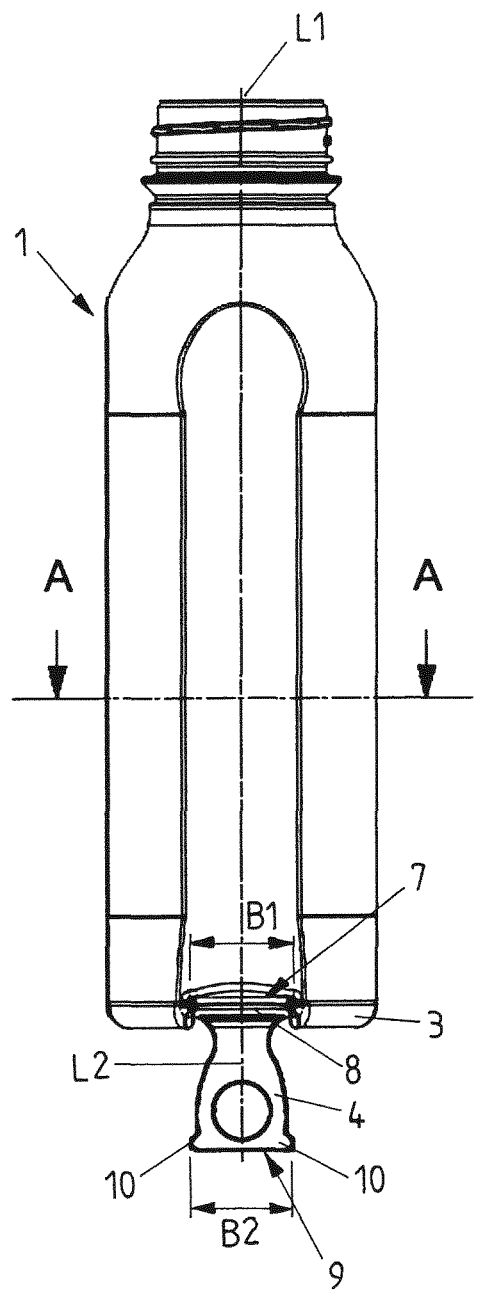
FIG. 2A shows a lateral view of the exemplary embodiment of FIG. 1.

FIG. 2A illustrates the bottle 1 from FIG. 1 in a lateral view. To this end, FIG. 2C also shows an enlarged illustration of the base region and of the hanger 4. FIGS. 2D and 2E once again show the base region of the bottle 1 with the hanger 4, which is integrally formed on the base 3, in a perspective detailed view. It can readily be seen in this view that the hanger 4, in the unfolded state, extends along a second direction of longitudinal extent L2 which, in the case of the illustration of FIG. 2A, is identical to the first direction of longitudinal extent L1 of the bottle 1. The length L of the hanger 4 is 25 mm to 35 mm. The thickness of the hanger 4, in particular in the region of the opening 17, is approximately 1.5 mm to 3 mm.

The receiving region 13 for the hanger 4 is located in the base region of the bottle 1. The receiving region 13 is designed here as a depression in the base 3 of the bottle 1. It can extend in a direction over the entire width of the bottle 1. In the present example, two receiving regions 13 are provided. The hanger 4 has a first end 7 which is arranged in the region of the base 3 of the bottle 1. The first end 7 is connected here to the base 3 via a hinge 8 integrally formed on the hanger 4. A second end 9 of the hanger 4 is formed lying opposite the first end 7 in the second direction of longitudinal extent L2.

The hinge 8 is what is referred to as a film hinge. The thickness of the hinge 8 is approximately 0.2 mm to 0.6 mm. The hinge extends over a first width B1 transversely with respect to the second direction of longitudinal extent L2. Said first width B1 can substantially correspond to a second width B2, over which the second free end 9 of the hanger 4 extends transversely with respect to the second direction of longitudinal extent L2. The hanger 4 is therefore of overall compact configuration and has ends 7, 9 corresponding to each other in their width B1, B2. The width B1 of the hinge 8 is 14 mm to 21 mm. The width B2 of the free end 9 of the hanger 4 is 20 mm to 26 mm. B1 is preferably smaller than B2.

The hinge 8 of the hanger 4 is not directly attached here to the base 3 of the bottle 1. The hinge 8 is arranged in the manner of a pedestal 21 which provides the transition to the base 3 of the bottle 1. In the embodiment illustrated, the pedestal 21 has, on the side to which the hinge 8 is connected, a type of ridge which extends transversely with respect to the longitudinal axis L1 and preferably extends over the entire receiving region 13. As a result, in particular the release of the hanger 4 from its fixed first position is facilitated (see below in this respect).

At the second end 9 of the hanger 4, two lateral, for example dome- or lug-like, projections 10 are formed in particular via a reduction in the width of the hanger 4 in the direction of the hinge 8. The width B3 which is reduced in relation to B2 lies within a range of 17 mm to 23 mm. A projection can have a width here of 0.5 mm to 3 mm. The hanger 4 can be fixed to the base 3 or in the receiving region 13 via the two projections 10 when said hanger is intended to be transferred into the first position in which it extends substantially along the base 3. FIGS. 2A to 2E illustrate the hanger 4 in its second position, in which it extends away from the base 3 in an angled manner. In the case of the illustration of the figures mentioned, the hanger 4 protrudes substantially perpendicularly from the base 3.

The receiving region 13 has lateral depressions 22 for receiving the two projections 10 of the hanger 4. In particular, the receiving region 13 has a respective depression 22 on both sides. In the first state of the hanger 4, the two projections 10 engage in the depressions 22. The hanger 4 is therefore releasably fixed in its first position. The depressions 22 have, for example, a height $V_H$ of 1 mm to 7 mm and/or a depth $V_T$ of 2 mm to 10 mm. In particular, the projections 10 are fixed in the depressions 22 with a snap action. The projections 10 and the depressions 22 which are lateral here form the connecting device for releasably fixing the hanger 4 in the receiving region 13.

The hanger 4 is preferably not fixed rigidly, but rather movably, in its first position. This is achieved in particular by the fact that at least the thickness of the free end 9, in particular of the entire hanger 4, is selected to be smaller than the height $A_H$ of the receiving region 13 for the hanger 4, and/or that the hinge 8 of the hanger 4 is not directly attached to the base 3 of the bottle, but rather to the pedestal 21. In particular, also for this purpose, the thickness of the free end 9 is selected to be smaller than the height $V_H$ of the depressions 22. As a result, in particular the release of the hanger 4 from its first position is facilitated since a manual engagement between the hanger 4 and the base 3 is facilitated.

In order even further to assist the manual engagement, for example by means of a fingertip and/or a fingernail, in the receiving region 13 in order to release the hanger 4 from its fixed first position, further structural measures can also be undertaken. For example, at least the upper outer edge 23 of the receiving region 13 is of concave and in particular curved design here (see FIG. 2C). Access to the hanger 4 can thereby be easier, in order to transfer the hanger from the first position illustrated in FIG. 3 into its second position (see FIG. 2A).

Figure 2B:
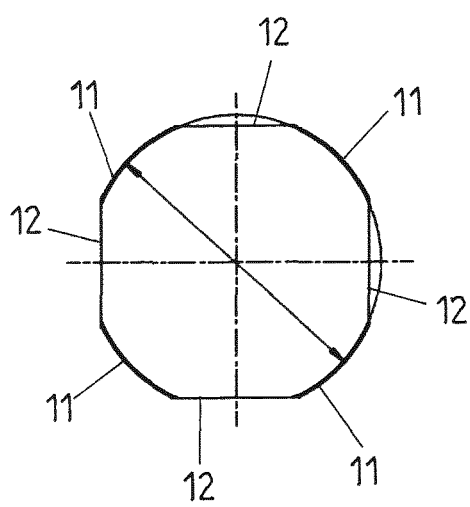
FIG. 2B shows a cross-sectional view of the exemplary embodiment of FIGS. 1 and 2A along the location (A-A) indicated in FIG. 2A.
Figure 2C:
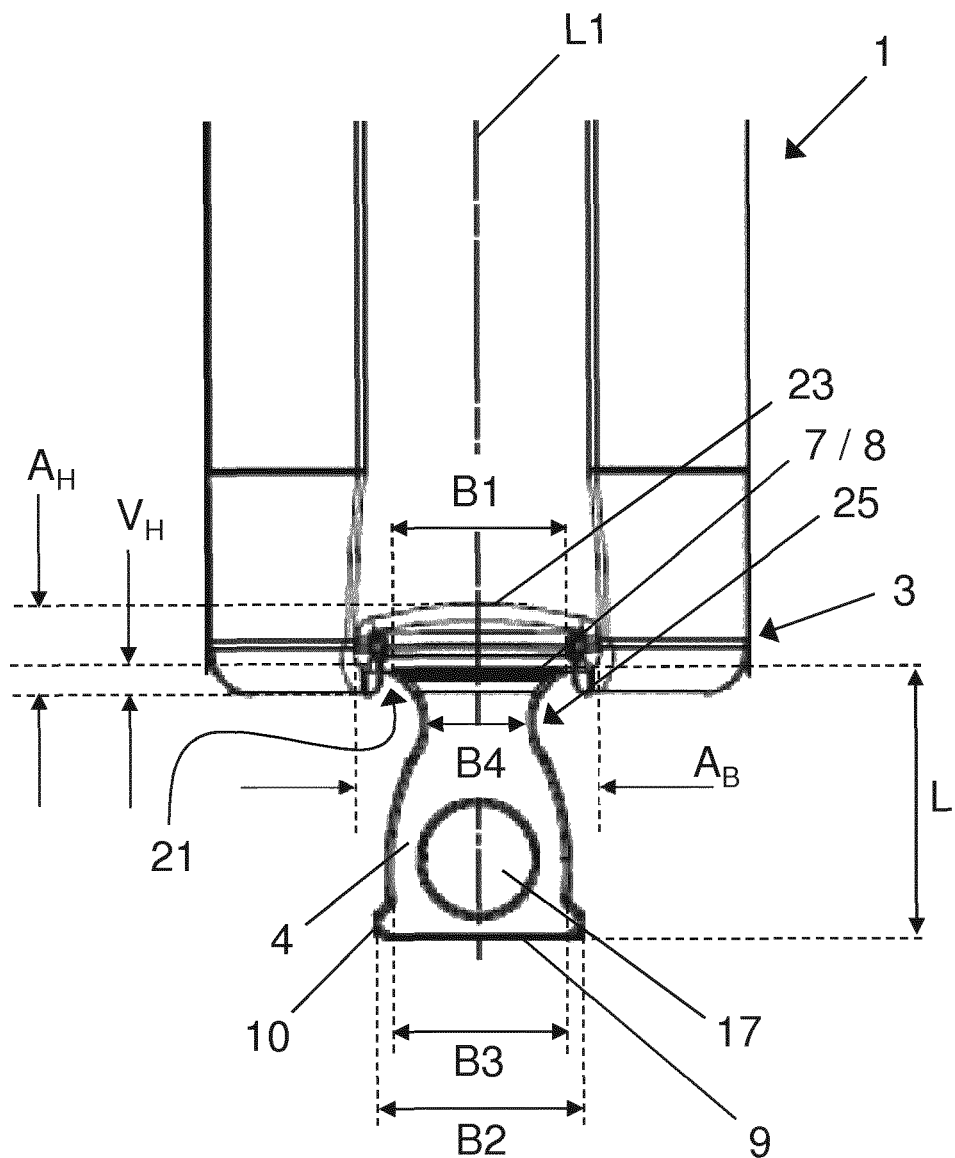
FIG. 2C shows an enlarged illustration of the base region and of the hanger from FIG. 2A.
Figure 2D:
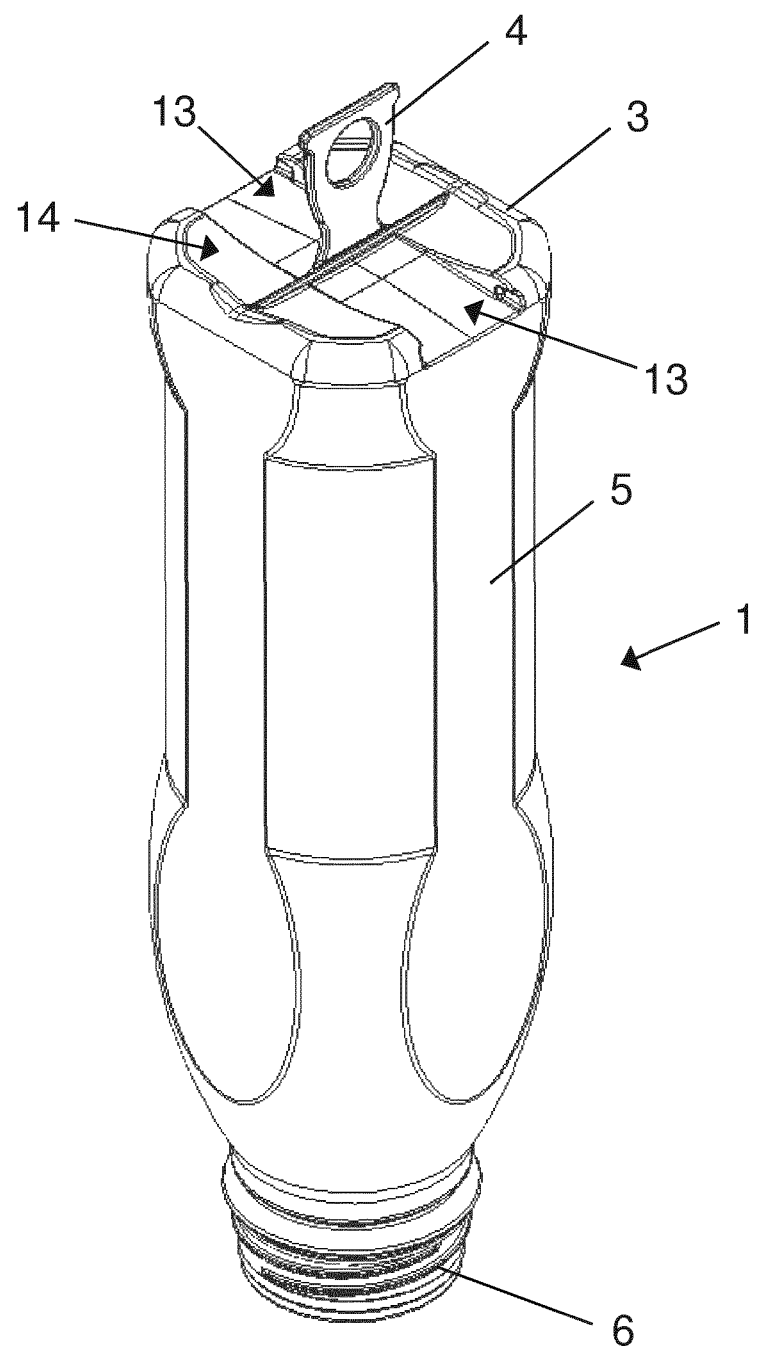
FIG. 2D shows a perspective view of the underside of the container from FIG. 2A with the hanger formed in the base region.
Figure 2E:
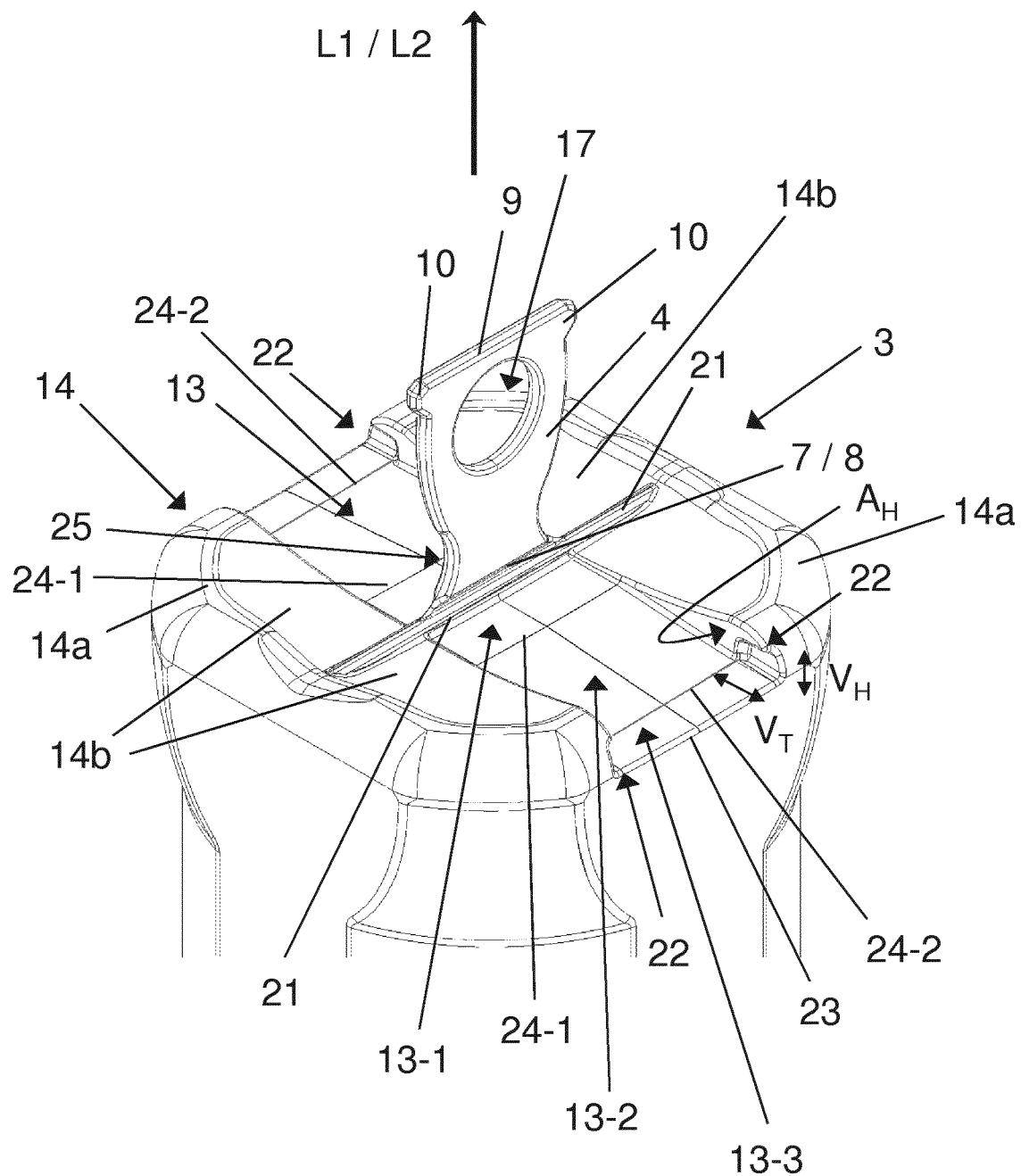
FIG. 2E shows an enlarged illustration of the base region and of the hanger from FIG. 2D.

In one embodiment, the receiving region 13 has a height AH which decreases from the outer side toward the longitudinal axis L1 of the bottle 1 (see FIG. 2E). As a result, the transfer of the hanger 4 from its first, fixed position into its second, protruding position can be assisted even further. In the exemplary embodiment illustrated, a first inner crease 24-1 is provided in the receiving region 13 and also a second outer crease 24-2 is provided toward the outer side of the container 1. The receiving region 13 is therefore provided here by three portions 13-1, 13-2 and 13-3. The first inner portion 13-1 runs substantially transversely, preferably perpendicularly, with respect to the longitudinal axis L1 of the container. The first inner portion 13-1 merges into a second central portion 13-2 via the first inner crease 24-1. The first inner first crease 24-1 is positioned at a distance of 5 mm to 10 mm from the pedestal 21. The second central portion 13-2 forms a, preferably rectilinear, ramp. The height AH of the receiving region 13 is rising here toward the outer side of the container 1. The second outer crease 24-2 is located approximately in the region of the rear edge of the receiving region 22. The outer third portion 13-3 forms a shorter ramp here with a greater pitch. The height AH of the receiving region 13 is therefore increased even further toward the outer side. As a result, the release of the hanger 4 from its fixed first position can be assisted even further. For example, the receiving region 13 has a height AH of 6 mm to 13 mm on the outer side of the bottle 1. The height AH is reduced toward the longitudinal axis L1, for example to a value of 0.5 mm to 5 mm. The width AB of the receiving region 13 with the depressions 22 is between 20 mm and 30 mm. Without the depressions 22, the width AB is reduced by approximately 0.5 mm to 4 mm. A depression 22 here can have a width of 0.25 mm to 2 mm. The width B2 of the hanger 4 at its free end 9 is greater than the width AB of the receiving region 13 without the depressions 22 but smaller than the width AB of the receiving region 13 with the depressions 22. The releasable fixing is therefore retained, but so too is the movability of the hanger 4 in its first fixed position. The first inner crease 24-1 and/or the second outer crease 24-2 can be provided by an angled transition or by a rounded transition.

A region 25 which has a constriction or indentation is preferably also formed between the free end 9 and the hinge 8 of the hanger 4. Said region is arranged here between the opening 17 and the hinge 8. Said region 25 has a reduced width B4 in relation to the hinge 8 and the free end 9 of the hanger 4. The width B4 is preferably within a range of 10 mm to 16 mm. This indentation provides a type of gripping region 25, for example for the index finger and the thumb, and can assist the hanging up of the bottle 1. The constriction 25 is of concave design or of concave design at least in sections here. For example, in the first position of the hanger 4, the inwardly curved constriction 25 permits engagement by means of the fingers. The hanger 4 has a shape differing from the receiving region 13 for the hanger 4, in particular also because of said constriction 25.

In the exemplary embodiment illustrated, the bottle 1, with the exception of the hanger 4, is of substantially mirror-symmetrical construction. Two receiving regions 13 for the hanger 4 are provided on both sides of the hinge 8. Said receiving regions are of substantially identical design here.

FIG. 2B shows a cross-sectional illustration of the bottle of FIG. 2A along the line A-A of FIG. 2A, which runs in a central region of the bottle 1. It can be seen in this cross-sectional illustration that the cross section is composed of mutually alternating portions 11 which are curved convexly (i.e. are curved outward) and rectilinear portions 12. In each case two convexly curved portions and in each case two rectilinear portions 12 lie opposite one another here. The rectilinear portions 12 substantially form the side walls 5 of the bottle 1. The convexly curved portions 11 substantially form the corners of the bottle 1. The upper concave edge 23 is substantially arranged in the region of the rectilinear portions 12. In particular, the receiving region 13 is substantially arranged in the region of the rectilinear portions 12.

Figure 3:
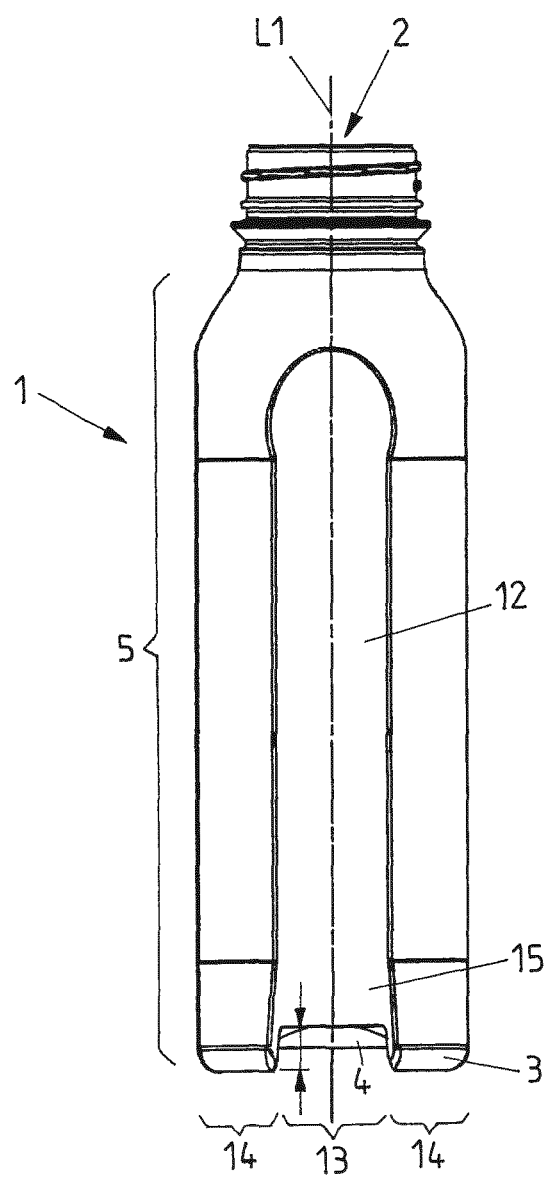
FIG. 3 shows a further lateral view of the exemplary embodiment of FIGS. 1 to 2E in the storage state.

FIG. 3 shows the bottle 1 of FIG. 2A, but in a lateral view, wherein the hanger 4 (illustrated in simplified form in the figure) is now stored in the receiving region 13 of the base 3 in its first position, which corresponds to a storage position. As a result, the bottle 1 can stand securely on the base 3 without the hanger 4 being in the way. The opening 2 is located here in an upwardly directed manner, i.e. the bottle 1 is in an upright position.

In the exemplary embodiment shown in the figures, the hanger 4 does not end flush with an underside of the remaining portions 14 of the base 3, but rather is offset in relation to said remaining portions 14 somewhat upward toward the bottle interior (see in this respect, for example, FIGS. 2E and 3). These remaining portions 14 of the base 3 comprise the foot region 14a of the bottle 1. The foot region 14a is provided by the outer region or the border region of the base 3 (see in this respect FIG. 2E). In the example illustrated, the foot region 14a is formed by four feet 14a. They each extend over a corner in the base 3. In addition, the base 3 has a trough 14b through which the receiving region 13 for the hanger 4 extends. The trough 14b is divided, preferably centrally, by the receiving region 13. The receiving region 13 is offset upward in relation to the base of the trough 14b in the direction of the opening 2 of the container 1. The trough extends here from the outer region of the base 3, said region forming the feet 14a, toward the center of the base 3. The trough 14b provides a region for engagement and/or guidance of the fingers. As a result, the gripping of the hanger 4, for example by means of the thumb and index finger, can be assisted. In order in particular to increase the stability of the hanger 4, the pedestal 21 extends away from the one side of the trough 14b over the receiving region 13 as far as the other side of the trough 14b. The precise arrangement of the hanger 4 in the receiving region 13 is predetermined by the height difference by which the base of the receiving region 13 is set back in relation to the remaining regions 14 of the base 3 along the first direction of longitudinal extent L1 (see in this respect the preceding description).

Figure 4:
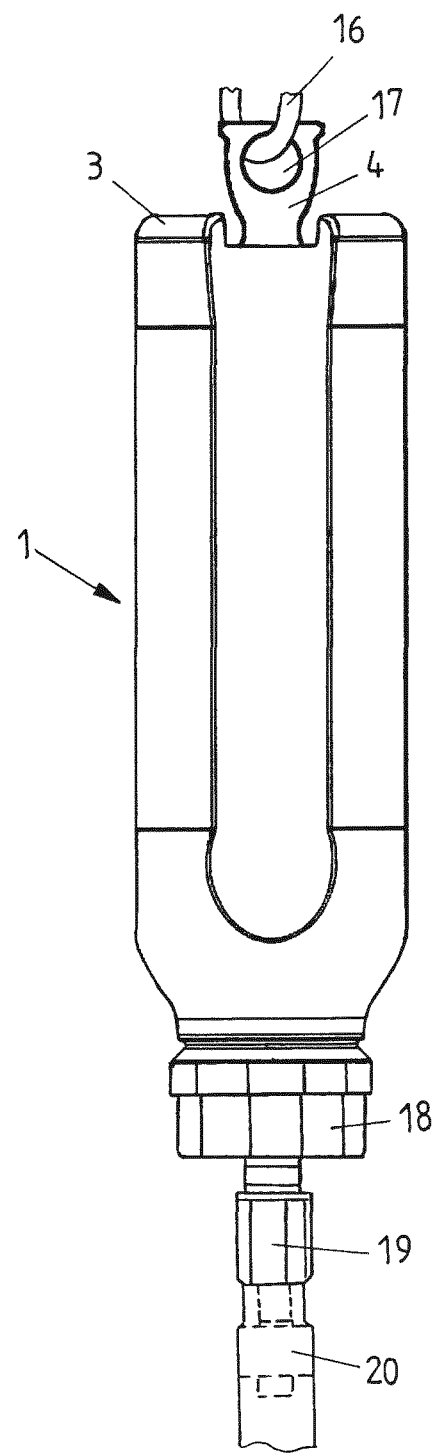
FIG. 4 shows a lateral view of the exemplary embodiment of FIGS. 1 to 3 in the use state.

FIG. 4 shows the bottle 1 of FIG. 3 in its use state. In this state, the hanger 4 is in its second position, i.e. protrudes at an angle from the base 3 of the bottle 1. A hook 16, which serves as a hanging device, reaches here through a hole 17 designed as an aperture in the hanger 4. The bottle 1 is arranged here in such a manner that its opening 2 points downward. The thread (cf. FIG. 1) is covered here by a lid 18 which has a connection 19 for a transfer system 20. By means of the transfer system 20, an enteral nutrient solution located in the bottle 1 can be supplied to a patient. Owing to the arrangement of the bottle with the opening downward, the nutrient solution can emerge from the bottle 1 by gravity.

If an interruption to the supply of nutrient is desired, it is possible, for example, for a valve in the transfer system 20 to be closed. Alternatively, it is also possible to remove the bottle 1 from the hook 16, to transfer the hanger 4 from its second position, illustrated in FIG. 4, into the first position, illustrated in FIG. 3, and to place the bottle by the base 3 on a corresponding underlying surface such that the opening of the bottle again points upward.

The volume of the bottle 1 can be within a range of 150 ml to 1000 ml, and therefore a sufficiently large amount of enteral nutrient solution can be kept in the bottle 1. The volume of the bottle 1 shown in the figures is, for example, 500 ml.

LIST OF REFERENCE SIGNS

1 Container or bottle
2 Opening
3 Base
4 Hanger or hanging element
5 Side walls
6 Thread
7 First end of the hanger
8 Hinge
9 Second end of the hanger
10 Projection
11 Convex portion
12 Rectilinear portion
13 Receiving region of the base
13-1 First inner portion of the receiving region 13
13-2 Second central portion of the receiving region 13
13-3 Third outer portion of the receiving region 13
14 Remaining region of the base
14a Foot region or feet
14b Trough or gripping trough
15 Concave portion
16 Hook
17 Hole
18 Lid
19 Connection
20 Transfer system
21 Pedestal for the hinge 8
22 Depression or receiving region for the projections 10
23 Upper outer edge of the receiving region 13
24-1 First inner crease in the base of the receiving region 13
24-2 Second outer crease in the base of the receiving region 13
25 Constriction or gripping region in the hanger 4
B1 Width of the hinge 8
B2 Width of the hanger 4 at the second free end 9
B3 Width of the hanger 4 below the projections 10
B4 Width of the gripping region 25 on the hanger 4
L Length of the hanger 4
$A_H$ Height of the receiving region on the outer side
$A_B$ Width of the receiving region on the outer side
L1 First direction of longitudinal extent (of the bottle)
L2 Second direction of longitudinal extent (of the hanger)
$V_H$ Height of the depression 22
$V_T$ Depth of the depression 22

The invention claimed is:

1. A container for receiving enteral nutrient solutions, said container comprising an opening via which an enteral nutrient solution can be brought into the container or out of the container, a base that lies opposite the opening in a direction of longitudinal extent of the container and serves for the depositing of the container upright on an underlying surface, a hanging element that is arranged on the base and can be present in a first position, in which the hanging element extends substantially along the base, or in a second position, in which the hanging element protrudes at an angle from a plane defined by the base, a hinge device that connects the hanging element to the base at a first end of the hanging element and that is provided and configured for enabling the hanging element to transition from the first position into the second position, wherein, in the base, a receiving region for the hanging element is formed, wherein, in the first position, the hanging element is releasably fixed in the receiving region by a releasable connecting device, wherein at least in a central portion substantially perpendicular to the direction of longitudinal extent of the container, the container has convexly-curved portions and rectilinear portions in an alternating arrangement, wherein the central portion has a cross-sectional width extending between a pair of opposing rectilinear portions passing through the longitudinal extent, wherein the rectilinear portions substantially form side walls of the container, wherein the convexly curved portions substantially form corners of the container;

wherein a base portion of the container that lies closer to the base than the central portion and an opening portion that lies closer to the opening of the container than the central portion have respective cross-sectional widths extending between a pair of opposing rectilinear portions through the longitudinal extent for respective portions such that the cross-sectional width of the base portion of the container and the cross-sectional width of the opening portion of the container are both greater than the cross-sectional width of the central portion of the container;

wherein said central portion extends between said base portion and said opening portion, and wherein said side walls comprise a side wall that extends through said base portion to said receiving region and widens in said base portion until said side wall meets said receiving region.

2. The container as claimed in claim 1, wherein the connecting device is provided by a snap-action connection.

3. The container as claimed in claim 1, wherein the hanging element comprises a second end that is opposite the first end and wherein a projection extends from the second end to engage behind a lateral depression of the receiving region, thereby fixing the hanging element in the first position.

4. The container as claimed in claim 1, wherein the hinge is arranged on a pedestal that provides a transition to the base and wherein the pedestal has a ridge to which the hinge is attached.

5. The container as claimed in claim 1, wherein the hanging element comprises a second end opposite said first end, wherein said second end is a free end, and wherein a constriction, which is concave at least in sections, is formed between the second end and the hinge.

6. The container as claimed in claim 1, further comprising a foot region and a trough, wherein the foot region is formed in an outer region of the base for allowing the container to be upright on the underlying surface, wherein the trough is formed in the base, wherein the receiving region for the hanging element extends through the trough, and wherein the trough starts from the foot region.

7. The container as claimed in claim 1, wherein the receiving region has a height that decreases from an outer side of the container toward the direction of the longitudinal extent of the container.

8. The container as claimed in claim 1, wherein the receiving region has an inner crease and, toward the outer side of the container, an outer crease, in each case in the direction of the opening of the container.

9. The container as claimed in claim 1, wherein an upper edge of the receiving region is formed concavely at least in some sections.

10. The container as claimed in claim 1, wherein at least in a portion facing the base in the direction of longitudinal extent (L1) of the container, the container has a cross section with convexly curved portions and with at least one concavely curved portion in an alternating arrangement, and the hanging element, in its first position, extends between two mutually opposite concavely curved portions.

11. The container as claimed in claim 1, wherein the hanging element comprises a second end opposite the first end and wherein the hinge device extends over a first width, wherein the second end has a second width, wherein the first width is smaller than the second width.

12. The container as claimed in claim 1, wherein the container, the hanging element, the hinge device, and a pedestal on which the hinge is arranged are formed integrally.

13. The container as claimed in claim 1, wherein at least in a portion facing the base in the direction of longitudinal extent of the container, the container has a cross section that has convexly curved portions and at least one concavely curved portion in an alternating arrangement.

14. The container as claimed in claim 1, wherein a first part and a second part of the receiving region for the hanging element are formed in the base of the container, wherein the hanging element is movable from the first part into the second part of the receiving region and back again, and wherein the first part and the second part of the receiving region are one or more of arranged opposite each other and of substantially identical design.

15. The container as claimed in claim 1, wherein the hanging element is movable relative to the releasable connecting device.

16. The container of claim 1, wherein said opening comprises a thread for screwing to a lid.

17. The container of claim 1, further comprising a foil that seals said opening.

18. The container of claim 1, further comprising a lid that has a connection for a transfer system.

19. The container of claim 1, wherein said hinge device is further configured to transfer the hanging element from the second position into the first position.

20. The container as claimed in claim 1, further comprising a foot region and a trough, wherein the foot region is formed in a border region of the base for allowing the container to be upright on the underlying surface, wherein the trough is formed in the base, wherein the receiving region for the hanging element extends through the trough, and wherein the trough starts from the foot region.

* * * * *